3,294,813
2-(5-TETRAZOLYL)-N-(SUBSTITUTED-PHENYL) ANILINES AND SALTS THEREOF
Peter F. Juby, Syracuse, N.Y., assignor to Bristol-Myers Company, New York, N.Y., a corporation of Delaware
No Drawing. Filed May 2, 1966, Ser. No. 546,546
21 Claims. (Cl. 260—308)

This application is a continuation-in-part of my prior, copending application Serial No. 447,517 filed April 12, 1965, and now abandoned.

This invention relates to certain novel anti-inflammatory agents and, more particularly, to 2-(5-tetrazolyl)-N-(substituted-phenyl)anilines.

It was the object of the present invention to provide novel, nonsteroidal anti-inflammatory agents having no serious side effects which would be of value, for example, in treating arthritis, rheumatism and other inflammatory diseases in mammals. It was a particular object of the present invention to provide anti-inflammatory agents which would not cause the stomach irritation and even ulceration which is characteristic of presently available anti-inflammatory agents.

The objects of the present invention have been achieved by the provision, according to the present invention, of the acidic compounds of the formula

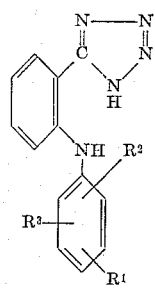

wherein $R^1$, $R^2$ and $R^3$ are each hydrogen, chloro, bromo, iodo, fluoro, trifluoromethyl, trifluoromethoxy, trifluoromethylthio, (lower)alkyl, (lower)alkoxy, nitro, methylsulfonyl, di(lower)alkylamino or (lower)alkylthio; and nontoxic, pharmaceutically acceptable salts thereof.

A preferred embodiment of the present invention is the group of acidic compounds and salts thereof in which the acidic compounds have the formula

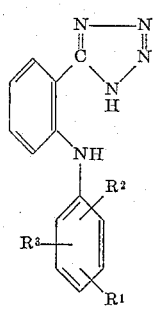

wherein $R^1$, $R^2$ and $R^3$ are each hydrogen, chloro, bromo, trifluoromethyl, methyl or nitro.

Another preferred embodiment of the present invention comprises the acidic compounds having the formula

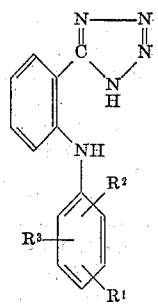

wherein $R^1$ is a member selected from the group consisting of chloro, bromo, iodo, fluoro, trifluoromethyl, trifluoromethoxy, trifluoromethylthio, (lower)alkyl, (lower)alkoxy, nitro, methylsulfonyl, di(lower)alkylamino and (lower)alkylthio and $R^2$ and $R^3$ are each a member selected from the group consisting of hydrogen, chloro, bromo, iodo, fluoro, trifluoromethyl, trifluoromethoxy, trifluoromethylthio, (lower)alkyl, (lower)alkoxy, nitro, methylsulfonyl, di(lower)alkylamino and (lower)alkylthio but $R^2$ is hydrogen only when $R^3$ is also hydrogen; and nontoxic, pharmaceutically acceptable salts thereof.

Other preferred embodiments of the present invention are the compounds of the formula

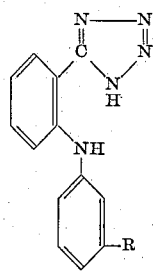

wherein R represents (lower)alkyl, and the compounds of the formula

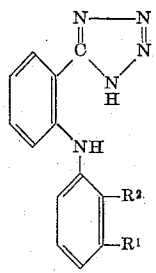

wherein $R^1$ and $R^2$ each represent (lower)alkyl, and the compounds of the formula

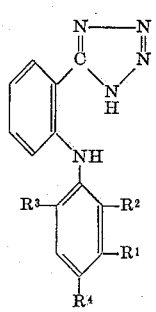

wherein $R^1$ represents hydrogen, trifluoromethyl or methyl and $R^2$, $R^3$ and $R^4$ each represent hydrogen, chloro or methyl, and the nontoxic, pharmaceutically acceptable cationic salts thereof.

As used herein the term (lower)alkyl signifies monovalent aliphatic radicals, whether branched or unbranched, which contain from one to six carbon atoms, inclusive, e.g. methyl, ethyl, propyl, isopropyl, n-butyl, sec.-butyl, tert.-butyl, isobutyl, n-hexyl, isohexyl, etc.

The nontoxic, pharmaceutically acceptable salts include metallic salts such as sodium, potassium, calcium and aluminum, the ammonium salt and substituted ammonium salts, e.g. salts of such nontoxic amines as trialkylamines, including triethylamine, procaine, dibenzylamine, N-benzyl-beta-phenethylamine, 1-ephenamine, N,N'-dibenzylethylenediamine, dehydroabietylamine, N,N'-bis-dehydroabiethylethylenediamine, N-(lower)alkylpiperidines, e.g. N-ethylpiperidine, and other amines which have been used to form salts with benzylpenicillin.

The compounds of the present invention are preferably prepared as exemplified below by the reaction of a nitrile of the formula

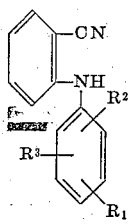

wherein $R^1$, $R^2$ and $R^3$ have the meaning set forth above, with at least an equimolar weight of an azide and preferably an inorganic azide, e.g., sodium azide, lithium azide, tetra-methylammonium azide, hydrazoic acid, ammonium azide, aluminum azide, in a liquid (and preferably anhydrous) medium for at least 12 hours at temperatures above room temperature and preferably in the range of about 80° C. to about 140° C. If desired there may be added as a catalyst a Lewis acid, e.g., boron trifluoride-etherate, tetra-alkylammonium chlorides, aniline hydrochloride, ammonium chloride, lithium chloride. Suitable liquid media include the monomethyl and ethyl ethers of ethylene and diethylene glycol and tetrahydrofuran, n-butanol and, particularly, dimethyl sulfoxide and dimethylformamide. The azidic compound may be added per se or prepared in situ. In particular, use may be made of the procedures of U.S. Patents 2,977,372, 3,155,666, 3,123,615 and those given by Finnegan et al., J. Amer. Chem. Soc. 80, 3908–3911 (1958), or in E. H. Rodd, "Chemistry of Carbon Compounds," vol. IV, pp. 481–486, D. H. Van Nostrand Co. Inc., New York, N.Y., 1957, or in the references cited therein, for the preparation of 5-substituted-aryl-tetrazoles.

The necessary nitriles are prepared as exemplified below by dehydration, as with phosphorus oxychloride, of the amides of the formula

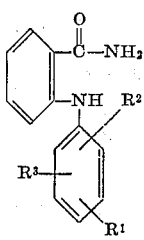

wherein $R^1$, $R^2$ and $R^3$ have the meaning set out above. These amides are prepared by standard methods from the corresponding anthranilic acids which in turn are prepared as exemplified below or as reported in the literature, e.g., by the Chapman rearrangement, or by analogous methods from the appropriately substituted anilines or phenols, for example. A large number of such substituted anthranilic acids are, for example, listed in Chemical Abstracts under the heading Anthranilic Acid, N-(substituted-phenyl); they are often prepared by the reaction in the presence of a copper-containing catalyst and a proton acceptor of an ortho-amino or ortho-halobenzoic acid (or ester) with an appropriately substituted halobenzene or aniline, respectively. For more details see U.S. Patent 3,138,636 or J. Chem. Soc. 33 (1948), or J. Amer. Chem. Soc. 82, 1600–1606 (1960), for example. Esters thus obtained are, of course, saponified to form the acid in the usual manner or are converted to the amides by reaction with ammonia, preferably in a solvent under pressure.

Anti-inflammatory tests of the compounds of the present invention were carried out on rats using the carrageenin-induced foot edema test of Charles A. Winter et al., Carrageenin-Induced Edema in Hind Paw of the Rat as an Assay for Anti-inflammatory Drugs, Proceedings of the Society for Experimental Biology and Medicine, 111, 544 (1962). The compound under investigation was given orally to the rat and one hour later carrageenin was injected subcutaneously into one paw. Three hours later the degree of edema was measured volumetrically by fluid displacement and compared to that of the control paw to give a result presented in terms of percentage inhibition of edema. Any result of more than 30% inhibition was greater than three times the standard deviation of the result in control animals and thus clearly indicated anti-inflammatory activity.

In the test described above a preferred compound of the present invention having the formula

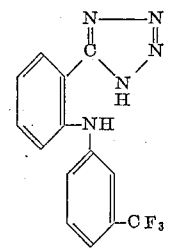

gave the following percentage inhibition of edema at the dosages in mgm./kg. given in parentheses: 41% (32), 32–37% (37.5), 52% (64), 40–42% (75), 55% (128), 44% (150), 73% (258), 56% (300). This compound was active in the dextran edema test and was found to show very low toxicity both as to mortality and pathology in a preliminary study of chronic toxicity.

In the test described above another preferred compound of the present invention having the formula

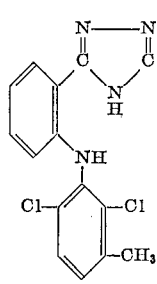

gave the following percentage inhibition of edema at the dosages in mgm./kg. given in parentheses: 48%

(128), 47% (64), 36% (32) and 27% (16). This compound is thus a very potent anti-inflammatory agent.

The following examples will serve to illustrate but not to limit the present invention. All temperatures are given in degrees centigrade and pressures in millimeters of mercury (mm.)

*Example 1*

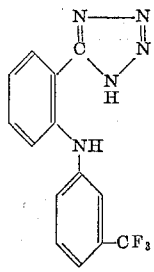

N-(3-trifluoromethylphenyl)anthranilic acid.—A mixture of 3-trifluoromethylaniline (22.0 g., 0.137 mole), o-chlorobenzoic acid (3.0 g., 0.0192 mole), anhydrous potassium carbonate (3.0 g., 0.0217 mole) and cupric oxide (100 mg.) was heated under reflux for two hours. The reaction mixture was cooled, washed with a dilute sodium hydroxide solution, and steam-distilled to remove the excess 3-trifluoromethylaniline. The aqueous residue was treated with decolorizing charcoal, filtered and the filtrate cooled and acidified with concentrated hydrochlorid acid. The precipitated solid was collected and crystallized from cyclohexane to give pale yellow-green crystals, 4.5 g., M.P. 130–133°. The product was treated with decolorizing charcoal in methanol and finally recrystallized from cyclohexane to give N-(3-trifluoromethylphenyl)anthranilic acid as pale yellow crystals, M.P. 132–133°, with partial melting and resolidification at 123–124° (lit. M.P. 125°; lit. M.P. 134–136°).

2-(3-trifluoromethylanilino)benzamide.—A solution of N-(3-trifluoromethylphenyl)anthranilic acid (197.0 g.) in ethanol (1 liter) containing concentrated sulfuric acid (70.0 g.) was heated under reflux for 18 hours. Most of the ethanol (800 ml.) was removed by distillation. A solution of the residue in benzene was washed twice with aqueous sodium carbonate and finally with water. The benzene was removed to leave a residue A.

An additional sample of N-(3-trifluoromethylphenyl) anthranilic acid (465.0 g.) was treated as above to yield a residue B.

Residues A and B were combined and distilled. The fraction (225.0 g.) boiling at 160–170°/0.1 mm. was collected. This crude sample of ethyl N-(3-trifluoromethylphenyl)anthranilate was not further characterized, but was used directly in the next step.

A solution of ethyl N-(3-trifluoromethylphenyl)anthranilate (225.0 g., 0.73 mole) and sodium methoxide (40.0 g., 0.74 mole) in dry methanol (1 liter) was saturated with ammonia gas. The reaction mixture was allowed to stand at room temperature for 156 hours. During this time the reaction mixture was resaturated with ammonia gas after 60, 84, 108 and 132 hours.

The reaction mixture was reduced to dryness and the residue poured onto ice-water. The precipitated product was extracted with chloroform. The chloroform solution was first washed with water then diluted with mixed lower alkanes ("Skellysolve B"). The solution was reduced in volume in a rotating evaporator until crystallization of the product commenced. The collected product, 2-(3-trifluoromethylanilino)benzamide (200.0 g.), had a M.P. of 125–127°. Part of the product was recrystallized from aqueous methanol to give colorless crystals, M.P. 126.5–128.5°.

Analysis.—Calc'd for $C_{14}H_{11}F_3N_2O$: C, 60.00; H, 3.96; N, 10.00. Found: C, 60.32; H, 4.00; N, 9.71.

2 - cyano - N - (3-trifluoromethylphenyl)aniline.—Triethylamine (0.72 g., 0.0071 mole) was added to a solution of 2-(3-trifluoromethylanilino)benzamide (1.0 g., 0.00357 mole) in phosphorus oxychloride (12 ml.). The solution was heated under reflux for 1.25 hours. The excess phosphorus oxychloride was removed under reduced pressure. A chloroform solution of the residue was poured onto ice-water. The aqueous layer was made basic with potassium carbonate. The chloroform layer was separated, dried over anhydrous sodium sulfate, then reduced to dryness in a rotating evaporator. The oily orange residue crystallized on standing. The residue was exhaustively extracted with "Skellysolve B." The extracts were combined, reduced in volume and cooled. The crystalline solid, 2-cyano-N-(3-trifluoromethylphenyl) aniline (0.65 g.) which was deposited was recrystallized twice from "Skellysolve B" to give very pale yellow crystals, M.P. 81–82°.

Analysis.—Calc'd for $C_{14}H_9N_2F_3$: C, 64.12; H, 3.46; N, 10.69. Found: C, 63.80; H, 3.54; N, 10.87.

2 - (5-tetrazolyl)-N-(3-trifluoromethylphenyl)aniline.—Sodium azide (0.33 g., 0.00508 mole) and ammonium chloride (0.265 g., 0.00495 mole) were added to a solution of 2-cyano-N-(3-trifluoromethylphenyl)aniline (1.0 g., 0.00382 mole) in dimethylformamide (8.0 ml.). The reaction mixture was heated, with stirring, at 120° for 16 hours. The dimethylformamide was removed in a rotating evaporator. The residue was treated with cold water and the resulting mixture filtered. The filtrate was acidified with concentrated hydrochloric acid. The precipitated solid was collected and crystallized from aqueous ethanol to give off-white crystals (0.5 g.). The product was recrystallized twice from aqueous ethanol to give colorless crystals, M.P. 205–207°.

Analysis.—Calc'd for $C_{14}H_{10}N_5F_3$: C, 55.07; H, 3.30; N, 22.94. Found: C, 55.30; H, 3.25; N, 22.92.

*Example 2*

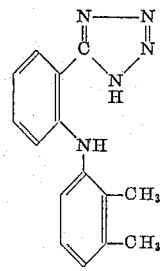

N-(2,3-xylyl)anthranilic acid.—A mixture of 2,3-dimethylaniline (600.0 g., 4.98 mole), o-chlorobenzoic acid (100.0 g., 0.64 mole), anhydrous potassium carbonate (132.0 g., 0.955 mole) and cupric oxide (3.5 g.) was heated under reflux for 1.5 hours. The mixture was cooled and filtered. The collected solid was well washed with "Skellysolve B." A solution of the solid in boiling water was treated with decolorizing charcoal. The solution was filtered, cooled and acidified with concentrated hydrochloric acid. The precipitated N-(2,3-xylyl)anthranilic acid was crystallized from methanol to give off-white needles (105.6 g.) M.P. 225–228° (dec.) (lit. M.P. 230–231°; lit. M.P. 229–230°).

Methyl N-(2,3-xylyl)anthranilate.—Concentrated sulfuric acid (50.0 g.) was added to a suspension of N-(2,3-xylyl)anthranilic acid (105.6 g.) in dry methanol (1 liter). The suspension was heated under reflux for 48 hours, when additional sulfuric acid (20.0 g.) was added and the refluxing continued for a further 24 hours. The methanol was removed under reduced pressure. The solid residue was partitioned between ether and aqueous potassium carbonate. The ether layer was separated, washed with water and dried over anhydrous sodium sulfate. Removal of the ether gave methyl N-(2,3-xylyl)anthranilate as a purple solid (89.3 g.) M.P. 87–98°. Part of the product was recrystallized twice from "Skellysolve B" and finally from methanol to give colorless crystals, M.P. 97–99°.

*Analysis.*—Calc'd for $C_{16}H_{17}NO_2$: C, 75.27; H, 6.71; N, 5.49. Found: C, 75.59; H, 6.98; N, 5.33.

*2-(2,3-dimethylanilino)benzamide.*—A suspension of methyl N-(2,3-xylyl)anthranilate (84.0 g., 0.33 mole, material M.P. 87–98°) and sodium methoxide (17.8 g., 0.33 mole) in methanol (1.2 liters) and benzene (400 ml.) was saturated with ammonia gas. The solution was allowed to stand at room temperature for 32 days. During this time the suspension was resaturated with ammonia after 1, 4, 7 and 12 days.

At the completion of the reaction time, the methanol and benzene were removed in a rotating evaporator. A chloroform solution of the residue was washed twice with water, dried, and reduced to dryness. The residue was well washed with "Skellysolve B" to leave 2-(2,3-dimethylanilino)benzamide (34.0 g.) with M.P. 148–151°. Part of the product was recrystallized twice from aqueous methanol to give pale yellow crystals, M.P. 149.5–151.5°.

*Analysis.*—Calc'd for $C_{15}H_{16}N_2O$: C, 74.97; H, 6.71; N, 11.66. Found: C, 74.95; H, 6.51; N, 11.90.

*2-cyano-N-(2,3-xylyl)aniline.*—Triethylamine (4.2 g., 0.0416 mole) was added to a solution of 2-(2,3-dimethylanilino)benzamide (5.0 g., 0.0208 mole) in phosphorus oxychloride (40 ml.). The solution was heated under reflux for 2.0 hours. The excess phosphorus oxychloride was removed under reduced pressure. A chloroform solution (50 ml.) of the residue was poured onto ice (50.0 g.). The aqueous layer was made basic with sodium carbonate. The layers were separated. The aqueous layer was extracted with fresh chloroform. The combined chloroform solutions were washed with aqueous sodium carbonate followed by water (twice) and dried over anhydrous sodium sulfate. The chloroform was removed to leave a quantitative yield of crude crystalline product, M.P. 129–136°. The product was recrystallized from aqueous methanol followed by methanol alone (with charcoal treatment in both cases) to give 2-cyano-N-(2,3-xylyl)aniline as pale yellow needles, M.P. 136–138°.

*Analysis.*—Calc'd for $C_{15}H_{14}N_2$: C, 81.05; H, 6.35; N, 12.61. Found: C, 80.72; H, 6.29; N, 12.71.

*2-(5-tetrazolyl)-N-(2,3-xylyl)aniline.*—A mixture of sodium azide (0.644 g., 0.00988 mole), ammonium chloride (0.53 g., 0.00988 mole) and 2-cyano-N-(2,3-xylyl)aniline (2.0 g., 0.00898 mole) in dimethylformamide (18 ml.) was heated, with stirring at 125° for 18 hours. The dimethylformamide was removed in a rotating evaporator. The residue was treated with water (40 ml.), and the mixture acidified with concentrated hydrochloric acid. The resulting solid was collected and crystallized from aqueous ethanol with charcoal treatment to give 2-(5-tetrazolyl)-N-(2,3-xylyl)aniline as very pale yellow crystals (2.0 g.). The product was recrystallized from aqueous ethanol to give colorless needles, M.P. 203.5–205.5°.

*Analysis.*—Calc'd for $C_{15}H_{15}N_5$: C, 67.90; H, 5.70; N, 26.40. Found: C, 68.01; H, 5.72; N, 26.43.

*Example 3*

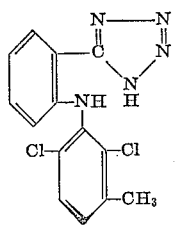

2-(5-tetrazolyl)-N-(2,6-dichloro-3-methylphenyl)aniline was synthesized by the following route:

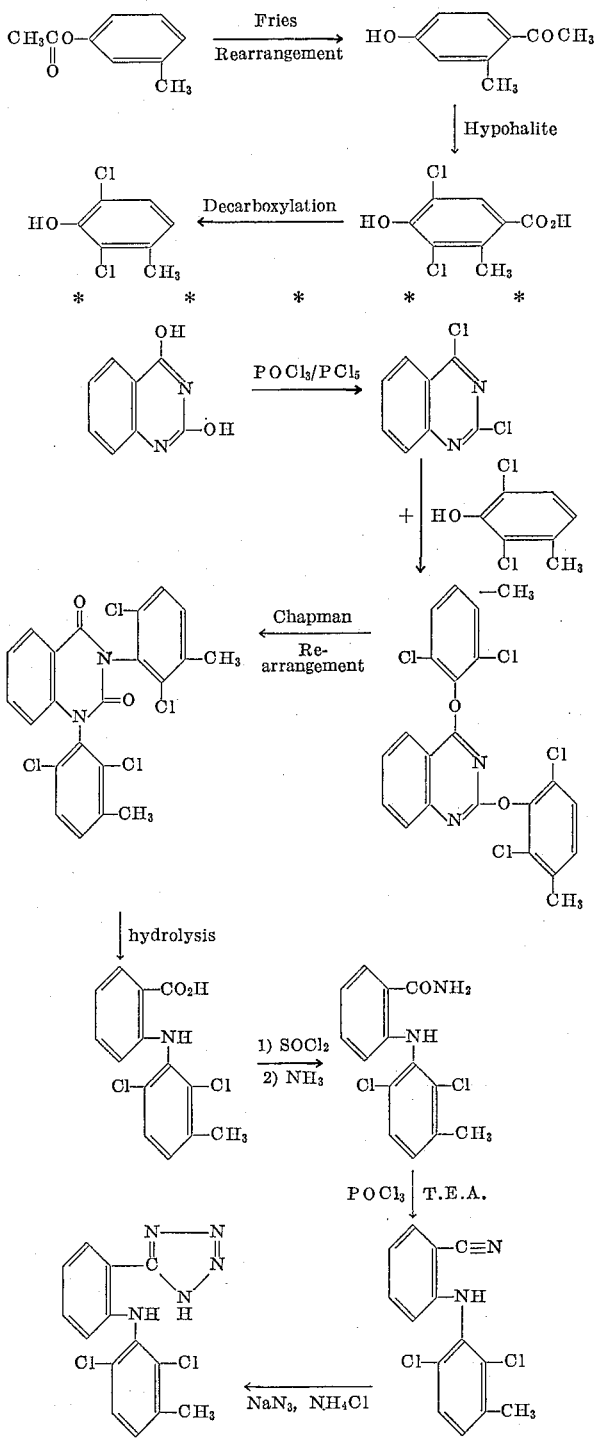

*4-hydroxy-2-methylacetophenone.*[1][2]—4-hydroxy-2-methylacetophenone (100 g.) was prepared from m-cresyl acetate (250 g.) by a method similar to that described in the literature. The product had M.P. 129–131° (lit.[2] M.P. 128°).

*3,5-dichloro-4-hydroxy-2-methylbenzoic acid.*—A solution of sodium hypochlorite was prepared by passing chlorine gas (252 g., 3.55 mole) into a solution of sodium hydroxide (341 g.) in water (470 ml.) containing ice (1950 g.). 4-hydroxy-2-methylacetophenone (83 g., 0.533 mole) was added, with stirring, to the hypochlorite solution, the latter being cooled with ice water. Stirring

[1] K. W. Rosenmund and W. Schnurr, Ann. 460: 56 (1928).
[2] A. H. Blatt, Organic Reactions, volume 1, R. Adams, editor (New York: John Wiley and Sons, Inc., 1942), page 354.

was continued for 20 minutes whilst the temperature of the reaction mixture was maintained at 10°. The exothermic reaction was then allowed to proceed, with the temperature being kept just below 40°. At the completion of the exothermic reaction, the solution was stirred for an additional 30 minutes at 40°. The reaction mixture was cooled to 25°. A solution of sodium bisulfite (60 g.) in water (200 ml.) was added, after which the reaction solution was acidified to pH 2 with concentrated hydrochloric acid. The precipitated solid was collected and crystallized from aqueous ethanol to give colorless needles (100 g.) M.P. 197–210°.

A portion of the product (8 g.) was partitioned between aqueous sodium bicarbonate and chloroform. The aqueous layer was acidified with concentrated hydrochloric acid. The precipitated product was collected and crystallized from aqueous ethanol to give 3,5-dichloro-4-hydroxy-2-methylbenzoic acid as long, colorless needles, M.P. 220–221.5°.

*Analysis.*—Calc'd for $C_8H_6Cl_2O_3$: C, 43.47; H, 2.74; Cl, 32.08. Found: C, 43.75; H, 2.86; Cl, 32.10.

*2,6-dichloro-3-methylphenol.*[3]—A suspension of 3,5-dichloro-4-hydroxy-2-methylbenzoic acid (191.6 g., 0.87 mole) in N,N-dimethylaniline (422 g.) was heated at 160° until the evolution of carbon dioxide ceased. The reaction mixture was then heated at 190° for 0.5 hour. Concentrated hydrochloric acid (450 ml.) was carefully added, with stirring, to the cooled reaction mixture. The resulting solution was extracted with six portions (200 ml. each) of diethyl ether. The combined ether extracts were washed with 6 N hydrochloric acid followed by water, and dried over anhydrous sodium sulfate. Removal of the ether from the filtered solution gave a liquid residue which was distilled. 2,6-dichloro-3-methylphenol was collected as the fraction (148.6 g.) with B.P. 103.5–105°/3.9 mm. (lit.[3] B.P. 240–242.5°/atmos.).

*2,4 - dichloroquinazoline.*—2,4 - dichloroquinazoline (57.2 g.) was prepared [4] from benzoylene urea (110 g.), phosphorus pentachloride and phosphorus oxychloride. The product (yellow-orange needles) had M.P. 116–118° (lit.[4] M.P. 120°).

*2,4 - bis(2,6-dichloro-3-methylphenoxy)quinazoline.*—A solution of 2,6-dichloro-3-methylphenol (97.8 g., 0.552 mole) in dimethylformamide (150 ml.) was slowly added to a stirred suspension of sodium hydride (22.6 g. of a 58.6% sodium hydride dispersion in mineral oil, 0.552 mole of sodium hydride) in dimethylformamide (100 ml.). When the evolution of hydrogen had ceased, the resulting solution was heated to 100°. To this solution was added a solution of 2,4-dichloroquinazoline (55.0 g., 0.276 mole) in dimethylformamide (275 ml.). The reaction mixture was heated at 144° for 18 hours.

The dimethylformamide was removed in a rotating evaporator. The residue was extracted with hot benzene. The benzene extract (A) and residue (B) were then worked up separately.

The benzene extract (A) was reduced in volume until solid material separated. The very pale yellow crystals (61.2 g.), M.P. 196.5–200°, were collected by filtration. The filtrate was reduced to dryness in a rotating evaporator, and the black gummy residue chromatographed in benzene over aluminum oxide (Merck) (450 g.). A yellow crystalline product (22.9 g.), M.P. 180–190° was recovered from the benzene eluate, which had an infrared spectrum identical to that of the product with M.P. 196.5–200°.

The residue (B) was partitioned between chloroform and water. The chloroform layer was dried and reduced to dryness. The solid residue was recrystallized from "Skellysolve B" to yield a colorless product (9.6 g.) M.P. 198.4–201.5°, with an infrared spectrum identical to that of the product with M.P. 196.5–200°.

The total yield of once-crystallized 2,4-bis(2,6-dichloro-3-methylphenoxy)quinazoline was 93.7 g.

A portion of the product with M.P. 198.4–201.5° was recrystallized twice from "Skellysolve B" to give colorless crystals, M.P. 199–201°.

*1,3 - bis(2,6 - dichloro - 3 - methylphenyl) - 2,4 - quinazolinedione.*—A suspension of 2,4-bis(2,6-dichloro-3-methylphenoxy)quinazoline (10 g.) in mineral oil (25 ml.) was heated at 345–350° for 130 minutes under an atmosphere of nitrogen.[5] "Skellysolve B" (100 ml.) was

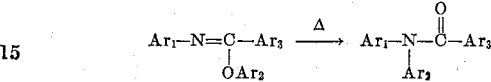

added to the cooled reaction mixture which was then filtered. The collected solid was extracted for 17 hours with "Skellysolve B" using a Soxhlet extractor. The extract was reduced to dryness to yield an orange solid (4.0 g.). Infrared spectra of the extracted material and the residue (3.5 g.) in the Soxhlet extractor were identical. The extracted material was recrystallized twice from acetonitrile, with treatment with decolorizing charcoal, to give 1,3 - bis(2,6 - dichloro-3-methylphenyl)-2,4-quinazolinedione as pale yellow crystals, M.P. 272–274°.

*Analysis.*—Calc'd for $C_{22}H_{14}Cl_4N_2O_2 \cdot \frac{1}{2}[C_2H_3N]$: C, 55.17; H, 3.12; Cl, 28.33; N, 7.00. Found: C, 55.43; H, 3.03; Cl, 28.30; N, 6.94.

*N-(2,6-dichloro-3-methylphenyl)anthranilic acid.*—A suspension of 1,3-bis(2,6-dichloro-3-methylphenyl)-2,4-quinazolinedione (47.4 g., 0.0988 mole) in ethylene glycol (298 ml.) and water (48 ml.) containing potassium hydroxide (48 g.) was heated under reflux for 2 hours. A solution of potassium hydroxide (40 g.) in water (40 ml.) and ethylene glycol (240 ml.) was added and heating was continued for a further 1 hour. The reaction mixture was allowed to stand at 25° for 17 hours, after which the mixture was again heated under reflux for 1 hour. A solution of potassium hydroxide (20 g.) in water (20 ml.) and ethylene glycol (120 ml.) was added at this point, and heating was continued for a further 2 hours by which time solution was complete. During this last period some of the water in the reaction mixture was allowed to escape.

Water (1 liter) was added to the cooled reaction solution. The solution was filtered and the filtrate acidified to pH 2 with concentrated hydrochloric acid. The precipitated solid was collected and crystallized from 95% ethanol to give pale yellow needles (24.4 g.), M.P. 252–254°. Part of the product was recrystallized from 95% ethanol, with charcoal treatment, to give N-(2,6-dichloro-3-methylphenyl)anthranilic acid as yellow needles, M.P. 256–256.5°.

*Analysis.*—Calc'd for $C_{14}H_{11}Cl_2NO_2$: C, 56.77; H, 3.75; Cl, 23.94; N, 4.73. Found: C, 56.81; H, 3.77; Cl, 23.59; N, 4.75.

*2 - (2,6-dichloro-3-methylanilino)benzamide.*—A suspension of N-(2,6-dichloro-3-methylphenyl)anthranilic acid (16.7 g., 0.0564 mole) in thionyl chloride (100 ml.) was heated at about 55° for 20 minutes. The solution was then heated under reflux for 10 minutes. The excess thionyl chloride was removed by distillation under reduced pressure, benzene (100 ml.) was added, and the mixture again reduced to dryness. Ice-cold, concentrated, aqueous ammonium hydroxide (300 ml.) was added to the cooled (0°) residue. The mixture was stirred at 0° for 1.5 hours, then at 25° for 4 hours. The solid product (16.5 g.) was collected and had M.P. 171–174.5°. A portion of the crude amide was recrystallized twice from aqueous acetonitrile and once from aqueous methanol. A solution of this product in methylene chloride was washed with aqueous potassium carbonate. The methyl-

---

[3] R. C. Huston and P. S. Chen., J. Am. Chem. Soc., 55: 4214 (1933).
[4] N. A. Lange, W. E. Roush and H. J. Asbeck, J. Am. Chem. Soc., 52: 3696 (1930).
[5] A. W. Chapman. J. Chem. So., 569 (1929). Chapman describes a general synthesis of diphenylamines by means of the following intramolecular rearrangement:

ene chloride was removed and the residue recrystallized twice from aqueous ethanol to give 2-(2,6-dichloro-3-methylanilino)benzamide as light brown needles, M.P. 178–179°.

2 - cyano - N - (2,6 - dichloro - 3 - methylphenyl)aniline.—Triethylamine (9.63 g., 0.0950 mole) was added to a cooled (ice-water) suspension of 2-(2,6-dichloro-3-methylanilino)benzamide (14 g., 0.0475 mole) in phosphorus oxychloride (100 ml.). The mixture was heated under reflux for 0.5 hour. The excess phosphorus oxychloride was removed under reduced pressure. A chloroform solution of the residue was well washed with aqueous potassium carbonate, followed by water. The solution was dried (anhydrous sodium sulfate) and the chloroform removed. The dark brown residue was exhaustively extracted with boiling "Skellysolve B." The combined "Skellysolve" extracts were reduced in volume and cooled. A portion of the crystalline solid (10.5 g.) which was deposited was recrystallized twice from "Skellysolve B" to give 2-cyano-N-(2,6-dichloro-3-methylphenyl)aniline as pale yellow needles, M.P. 132–134°.

Anal.—Calc'd for $C_{14}H_{10}Cl_2N_2$: C, 60.67; H, 3.64; Cl, 25.59; N, 10.11. Found: C, 60.69; H, 3.82; Cl, 25.21; N, 10.25.

2 - (5 - tetrazolyl) - N - (2,6 - dichloro - 3 - methylphenyl)aniline.—A mixture of 2-cyano-N-(2,6-dichloro-3-methylphenyl)aniline (9 g., 0.0325 mole), sodium azide (2.535 g., 0.0390 mole) and ammonium chloride (2.085 g., 0.0390 mole) in dimethylformamide (65 ml.) was heated, with stirring, at about 127° for 17 hours. The dimethylformamide was removed in a rotating evaporator. The residue was suspended in cold water (300 ml.) which was acidified to pH 2 with concentrated hydrochloric acid. The solid product was collected and crystallized from aqueous methanol (with charcoal treatment) to give 2-(5-tetrazolyl)-N-(2,6-dichloro-3-methylphenyl)aniline as yellow needles (8.6 g.). The product was recrystallized from aqueous methanol to give yellow needles, M.P. 207–208.5° (dec.).

Anal.—Calc'd for $C_{14}H_{11}Cl_2N_5$: C, 52.52; H, 3.46; Cl, 22.15; N, 21.88. Found: C, 52.60; H, 3.73; Cl, 22.38; N, 21.88.

Example 4

Substitution for the 3-trifluoromethylaniline in the procedure of Example 1 of an equimolar weight of 2,6-dichloro-3-trifluoromethylaniline,
2,3,6-trimethylaniline,
3-nitroaniline,
2-chloro-3-methylaniline,
3-chloro-2-methylaniline,
6-chloro-2,3-dimethylaniline, and
3-trifluoromethoxyaniline, respectively, produces
2-(5-tetrazolyl)-N-(2,6-dichloro-3-trifluoromethylphenyl)aniline,
2-(5-tetrazolyl)-N-(2,3,6-trimethylphenyl)aniline,
2-(5-tetrazolyl)-N-(3-nitrophenyl)aniline,
2-(5-tetrazolyl)-N-(2-chloro-3-methylphenyl)aniline,
2-(5-tetrazolyl)-N-(3-chloro-2-methylphenyl)aniline,
2-(5-tetrazolyl)-N-(6-chloro-2,3-dimethylphenyl)aniline, and
2-(5-tetrazolyl)-N-(3-trifluoromethoxyphenyl)aniline, respectively.

Example 5

Substitution for the 3-trifluoromethylaniline in the procedure of Example 1 of an equimolar weight of 2,6-dibromo-3-trifluoromethylaniline,
2-bromo-3-methylaniline,
3-bromo-2-methylaniline and
6-bromo-2,3-dimethylaniline, respectively, produces
2-(5-tetrazolyl)-N-(2,6-dibromo-3-trifluoromethylphenyl)aniline,
2-(5-tetrazolyl)-N-(2-bromo-3-methylphenyl)aniline,
2-(5-tetrazolyl)-N-(3-bromo-2-methylphenyl)aniline, and
2-(5-tetrazolyl)-N-(6-bromo-2,3-dimethylphenyl)aniline, respectively.

Example 6

Substitution for the N-(3-trifluoromethylphenyl)anthranilic acid in the procedure of Example 1 of an equimolar weight of N-(2,6-dichloro-3-trifluoromethylphenyl)anthranilic acid,
N-(2,6-dibromo-3-trifluoromethylphenyl)anthranilic acid,
N-(2,3,6-trimethylphenyl)anthranilic acid,
N-(6-chloro-2,3-dimethylphenyl)anthranilic acid, and
N-(6-bromo-2,3-dimethylphenyl)anthranilic acid, respectively, produces 2-(5-tetrazolyl)-N-(2,6-dichloro-3-trifluoromethylphenyl)aniline,
2-(5-tetrazolyl)-N-(2,6-dibromo-3-trifluoromethylphenyl)aniline,
2-(5-tetrazolyl)-N-(2,3,6-trimethylphenyl)aniline,
2-(5-tetrazolyl)-N-(6-chloro-2,3-dimethylphenyl)aniline, and
2-(5-tetrazolyl)-N-(6-bromo-2,3-dimethylphenyl)aniline, respectively.

These five anthranilic acids are prepared from

2',6'-dichloro-3'-trifluoromethylbenzanilide,
2',6'-dibromo-3'-trifluoromethylbenzanilide,
2',3',6'-trimethylbenzanilide,
6'-chloro-2',3'-dimethylbenzanilide, and
6'-bromo-2',3'-dimethylbenzanilide, respectively, by conversion to the corresponding benzimidoyl chlorides by reaction with an excess of phosphorous pentachloride at about 80–115° C., e.g. according to U.S. Patent 3,138,636. Reacting the benzimidoyl chloride with methyl salicylate and sodium ethoxide in dry ether yields a crude imido ester which is isolated and heated in a nitrogen atmosphere at 225–245° C. for 90 minutes to give the methyl ester of the N-benzoyl derivative of the desired anthranilic acid. Heating this product to 75–150° C. in aqueous sodium hydroxide (to which ethanol may be added to increase its solubility) for several hours followed by acidification produces the desired anthranilic acid.

Example 7

Substitution for the 2,6-dicholro-3-methylphenol in the procedure of Example 3 of an equimolar weight of 2,6-dichloro-3-trifluoromethylphenol,
2,6-dibromo-3-trifluoromethylphenol,
2,3,6-trimethylphenol,
6-chloro-2,3-dimethylphenol, and
6-bromo-2,3-dimethylphenol, respectively, produces
2-(5-tetrazolyl)-N-(2,6-dichloro-3-trifluoromethylphenyl)aniline,
2-(5-tetrazolyl)-N-(2,6-dibromo-3-trifluoromethylphenyl)aniline,
2-(5-tetrazolyl)-N-(2,3,6-trimethylphenyl)aniline,
2-(5-tetrazolyl)-N-(6-chloro-2,3-dimethylphenyl)aniline, and
2-(5-tetrazolyl)-N-(6-bromo-2,3-dimethylphenyl)aniline, respectively.

Example 8

Substitution for the 2,6-dichloro-3-methylphenol in the procedure of Example 3 of an equimolar weight of phenol,
m-nitrophenol,
2,4,6-trichlorophenol,
o-chlorophenol,
2,3,6-trichlorophenol, and
3,6-dichloro-2-methylphenol, respectively, produces
2-(5-tetrazoly)-N-(phenyl)aniline, 2-(5-tetrazolyl)-N-(3-nitro-phenyl)aniline,
2-(5-tetrazolyl)-N-(2,4,6-trichloro-phenyl)aniline,
2-(5-tetrazolyl)-N-(2-chloro-phenyl)aniline,
2-(5-tetrazolyl)-N-(2,3,6-trichloro-phenyl)aniline, and
2-(5-tetrazoly)-N-(3,6-dichloro-2-methyl-phenyl)aniline, respectively.

Example 9

Substitution for the 3-trifluoromethylaniline and the 2,6-dichloroaniline in the procedures of Examples 1 and 12, respectively, of an equimolar weight of aniline,
m-nitroaniline,
2,4,6-trichloroaniline,
o-chloroaniline,
2,3,6-trichloroaniline, and
3,6-dichloro-2-methylaniline, respectively, produces 2-(5-tetrazoly)-N-(phenyl)aniline,
2-(5-tetrazolyl)-N-(3-nitro-phenyl)aniline,
2-(5-tetrazolyl)-N-(2,4,6-trichloro-phenyl)aniline,
2-(5-tetrazolyl)-N-(2-chloro-phenyl)aniline,
2-(5-tetrazolyl)-N-(2,3,6-trichloro-phenyl)aniline, and
2-(5-tetrazolyl)-N-(3,6-dichloro-2-methyl-phenyl)aniline, respectively.

Example 10

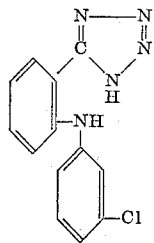

*2-(3-chloroanilino)benzamide.*—A suspension of N-(3-chlorophenyl)anthranilic acid (11.4 g., 0.046 mole) in methylene chloride (75 ml.) containing thionyl chloride (6.0 g., 0.0505 mole) was heated under reflux for 20 min. The resulting solution was cooled and added slowly to an ammonium hydroxide solution (150 ml., sp. gr. 0.90) which was maintained at 10–15° C. The mixture was then stirred at room temperature for 25 min. The methylene chloride layer was separated, dried over anhydrous sodium sulfate, and reduced to dryness to give an orange crystalline solid (11.1 g.). A portion of the solid was recrystallized from "Skellysolve B"-benzene followed by cyclohexane-benzene to give 2-(3-chloroanilino)benzamide as pale yellow-green crystals, M.P. 140–141°.

*Anal.*—Calcd. for $C_{13}H_{11}ClN_2O$: C, 63.30; H, 4.50; Cl, 14.37; N, 11.36. Found: C, 63.57; H, 4.72; Cl, 14.56; N, 11.40.

*N-(3-chlorophenyl)-2-cyanoaniline.*—Triethylamine (7.5 g., 0.074 mole) was added, with cooling to a suspension of 2-(3-chloroanilino)benzamide (9.0 g., 0.0365 mole) in phosphorus oxychloride (60 ml.). The resulting mixture was heated under reflux for 40 min. The excess phosphorus oxychloride was removed under reduced pressure. A solution of the oily residue in chloroform was poured onto crushed ice and the aqueous layer made basic with ammonium hydroxide solution (sp. gr. 0.90). The chloroform layer was separated, washed with water, dried over anhydrous sodium sulfate, and reduced to dryness to leave a buff solid. The solid was recrystallized from cyclohexane to give N-(3-chlorophenyl)-2-cyanoaniline as buff crystals (7.5 g.) M.P. 109–112°. Recrystallization, with treatment with decolorizing carbon, gave pale yellow crystals, M.P. 111–112.5°.

*Anal.*—Calcd. for $C_{13}H_9ClN_2$: C, 68.26; H, 3.97; Cl, 15.50; N, 12.26. Found: C, 68.27; H, 4.09; Cl, 15.53; N, 12.40.

*N-(3-chlorophenyl)-2-(5-tetrazolyl)aniline.*—A mixture of N-(3-chlorophenyl)-2-cyanoaniline (5.5 g., 0.024 mole) sodium azide (1.8 g., 0.0277 mole) and ammonium chloride (1.5 g., 0.028 mole) in dimethylformamide (45 ml.) was heated, with stirring, at 120–130° for 16 hrs. The reaction mixture was reduced to dryness. The residue was treated with water (250 ml.) and enough sodium carbonate to make the mixture basic. The resulting solution was washed with chloroform, treated with decolorizing carbon, filtered, cooled, and acidified with concentrated hydrochloric acid. The precipitated buff solid was crystallized from aqueous ethanol to give buff needles (5.1 g.), M.P. 207–208°. The product was recrystallized from aqueous ethanol, with treatment with decolorizing carbon, to give N-(3-chlorophenyl)-2-(5-tetrazolyl)aniline as pale buff needles, M.P. 207–208°.

*Anal.*—Calcd. for $C_{13}H_{10}ClN_5$: C, 57.46; H, 3.71; Cl, 13.05; N, 25.78. Found: C, 57.74; H, 3.78; Cl, 13.42; N, 25.95.

Example 11

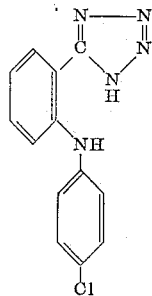

*2-(4-chloroanilino)benzamide.*—2-(4-chloroanilino)-benzamide (12.1 g.) was obtained from N-(4-chlorophenyl)anthranilic acid (13.0 g.) by a method similar to that described above for 2-(3-chloroanilino)benzamide. The product was recrystallized twice from benzene to give pale yellow needles, M.P. 156–157°.

*Anal.*—Calcd. for $C_{13}H_{11}ClN_2O$: C, 63.30; H, 4.50; Cl, 14.37; N, 11.36. Found: C, 63.40; H, 4.61; Cl, 14.23; N, 11.54.

*N-(4-chlorophenyl)-2-cyanoaniline.*—2-(4-chloroanilino)-benzamide (9.0 g.) was dehydrated to give N-(4-chlorophenyl)-2-cyanoaniline (7.4 g.), M.P. 131–133°, by a method similar to that described above for the preparation of N-(3-chlorophenyl)-2-cyanoaniline. The product was recrystallized from cyclohexane, with treatment with decolorizing carbon, to give pale yellow crystals, M.P. 132.5–133.5°.

*Anal.*—Calcd. for $C_{13}H_9ClN_2$: C, 68.26; H, 3.97; Cl, 15.50; N, 12.26. Found: C, 68.54; H, 3.99; Cl, 15.68; N, 12.36.

*N-(4-chlorophenyl)2-(5-tetrazolyl)aniline.*—A mixture of N-(4-chlorophenyl)-2-cyanoaniline (5.0 g., 0.0218 mole), sodium azide (1.8 g., 0.0277 mole) and ammonium chloride (1.5 g., 0.028 mole) in dimethylformamide (45 ml.) was heated with stirring at about 125° for 16 hrs. The reaction mixture was reduced to dryness. The residue was treated with water and enough sodium carbonate to give a clear solution. The solution was washed with chloroform, treated with decolorizing carbon, filtered, cooled, and acidified with concentrated hydrochloric acid. The precipitated solid was collected, dried, and crystallized from 100% ethanol to give off-white needles (4.2 g.), M.P. 237–238°. The product was recrystallized, with treatment with decolorizing carbon, from 100% ethanol to give N-(4-chlorophenyl)-2-(5-tetrazolyl)aniline as off-white crystals, M.P. 238–239°.

*Analysis.*—Calcd. for $C_{13}H_{10}ClN_5$: C, 57.46; H, 3.71; Cl, 13.05; N, 25.78. Found: C, 57.65; H, 3.76; Cl, 13.38; N, 25.88.

Example 12

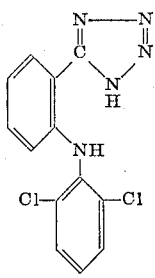

*N-(2,6-dichlorophenyl)anthranilic acid.*—A mixture of potassium o-bromobenzoate (47.8 g., 0.20 mole), 2,6-dichloroaniline (32.4 g., 0.20 mole), and calcium hydride (4.22 g., 0.1 mole) in diethylene glycol dimethyl ether (100 ml.) was heated to about 85° under an atmosphere of nitrogen when cupric bromide (1.5 g.) was added. The temperature of the heating bath was then raised to and maintained at 160° for 2.25 hrs. Water (100 ml.) followed by 2 N sodium hydroxide solution (500 ml.) was cautiously added to the cooled reaction mixture. The mixture was filtered and the filtrate was treated with decolorizing carbon, washed with ether, cooled, and acidified with concentrated hydrochloric acid. The precipitated solid was collected and crystallized from aqueous methanol to give an off-white product (8.5 g.), M.P. 214–218°. The product was recrystallized twice from methanol to give N-(2,6-dichlorophenyl)anthranilic acid as white crystals, M.P. 218–220°.

*Analysis.*—Calcd. for $C_{13}H_9Cl_2NO_2$: C, 55.34; H, 3.22; Cl, 25.14; N, 4.97. Found: C, 55.55; H, 3.32; Cl, 25.42; N, 4.83.

*2-(2,6-dichloroanilino)benzamide.*—A suspensoin of N-(2,6-dichlorophenyl)anthranilic acid (1.0 g.) in thionyl chloride (8 ml.) was heated at 60° until there was no further gaseous evolution. Heating at 60° was continued for a further 10 min., after which the reaction mixture was heated under reflux for 5 min. The mixture was reduced to dryness. Benzene (10 ml.) was added to the residue and the mixture again reduced to dryness. Ice-cold ammonium hydroxide (20 ml., sp. gr. 0.90) was rapidly added to the yellow crystalline residue. The resulting mixture was allowed to stand at 25° for 17 hrs. The reaction mixture was filtered. A methylene chloride solution of the collected solid (0.98 g.), M.P. 131–140°, was washed with an aqueous sodium bicarbonate solution, dried over anhydrous sodium sulfate, and reduced to dryness. The solid residue was recrystallized from aqueous ethanol, after treatment with decolorizing carbon, to give colorless crystals, M.P. 136–140°. Two recrystallizations from benzene gave 2-(2,6-dichloroanilino)benzamide as colorless needles, M.P. 140–142°.

*Analysis.*—Calcd. for $C_{13}H_{10}Cl_2N_2O$: C, 55.54; H, 3.59; Cl, 25.22; N, 9.97. Found: C, 55.55; H, 3.61; Cl, 25.09; N, 9.95.

*2-cyano-N-(2,6-dichlorophenyl)aniline.*—2-(2,6-dichloroanilino)benzamide (7.3 g.) was dehydrated to give 2-cyano-N-(2,6-dichlorophenyl)aniline (5.34 g.), M.P. 102–104°, by a method similar to that described above for the preparation of N-(3-chlorophenyl)-2-cyanoaniline. The product was recrystallized from "Skellysolve B" to give yellow crystals, M.P. 103–104°.

*Analysis.*—Calcd. for $C_{13}H_8Cl_2N_2$: C, 59.34; H, 3.06; Cl, 26.95; N, 10.65. Found: C, 59.64; H, 3.18; Cl, 26.81; N, 10.61.

*N-(2,6-dichlorophenyl)-2-(5-tetrazolyl)aniline.*—A mixture of 2-cyano-N-(2,6-dichlorophenyl)aniline (4.5 g., 0.0171 mole), sodium azide (1.365 g., 0.021 mole) and ammonium chloride (1.123 g., 0.021 mole) in dimethylformamide was heated, with stirring, at 130° for 24 hrs. The reaction mixture was reduced to dryness. Water (100 ml.), followed by enough 5% sodium hydroxide solution to complete solution, was added to the residue. The solution was acidified with concentrated hydrochloric acid. The precipitated gummy solid was recrystallized from aqueous ethanol to give off-white crystals (3.29 g.), M.P. 184°. The product was recrystallized twice from benzene and finally from aqueous methanol to give (N-(2,6-dichlorophenyl)-2-(5-tetrazolyl)aniline as pale yellow crystals, M.P. 187.5–189.5°.

*Analysis.*—Calcd. for $C_{13}H_9Cl_2N_5$: C. 51.00; H, 2.96; Cl, 23.16; N, 22.88. Found: C, 51.13; H, 3.13; Cl, 23.37; N, 23.05.

In the carrageenin test described above this compound at a dosage of 150 mgm./kg. gave 47% inhibition of edema.

Example 13

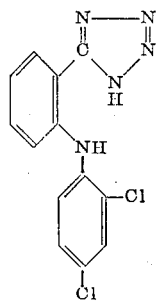

*2-(2,4-dichloroanilino)benzamide.*—Thionyl chloride (5.76 g., 0.0484 mole) was added to a suspension of N-(2,4-dichlorophenyl)anthranilic acid (13.0 g., 0.0461 mole) in methylene chloride (79 ml.). The suspension was heated under reflux for one hr. Dimethylformamide (13 drops) was added to the reaction mixture, which was heated under reflux for a further 3 hrs. The cooled reaction mixture was filtered to give a solid A and filtrate B. The filtrate B was reduced to dryness to give a solid B which was shown to be identical with solid A. Solids A and B were combined and added to an ice-cold ammonium hydroxide solution (300 ml., sp. gr. 0.90). The mixture was stirred at 25° for 24 hrs. The mixture was filtered to yield a yellow granular solid (12.07 g.), M.P. 141–157°. A portion of the solid was recrystallized twice from methanol to give 2-(2,4-dichloroanilino)benzamide as pale yellow needles M.P. 163–165°.

*2-cyano-N-(2,4-dichlorophenyl)aniline.*—2-(2,4-dichloroanilino)benzamide (10.0 g.) was dehydrated to give 2-cyano-N-(2,4-dichlorophenyl)aniline (7.06 g.) M.P. 132–134° by a method similar to that described above for the preparation of N-(3-chlorophenyl)-2-cyanoaniline. The product was recrystallized from methanol, after treatment with decolorizing carbon, to give yellow needles, M.P. 132–134°.

*Anal.*—Calcd. for $C_{13}H_8Cl_2N_2$: C, 59.34; H, 3.06; Cl, 26.95; N, 10.65. Found: C, 59.64; H, 3.30; Cl, 27.08; N, 10.52.

*N-(2,4-dichlorophenyl)-2-(5-tetrazolyl)aniline.*—A mixture of 2-cyano-N-(2,4-dichlorophenyl)aniline (6.0 g., 0.0228 mole), sodium azide (1.856 g., 0.0285 mole) and ammonium chloride (1.525 g., 0.0285 mole) in dimethylformamide (44 ml.) was heated, with stirring, at 130° for 24 hrs. The reaction mixture was reduced to dryness. Water (200 ml.), followed by 5% sodium hydroxide solution until solution was complete, was added to the residue. The solution was washed twice with methylene chloride, cooled, and acidified with concentrated hydrochloric acid. The precipitated solid was collected, dried, and recrystallized from ethanol (after charcoal treatment) to give colorless needles (5.0 g.), M.P. 250–251° (dec.). The product was recrystallized from ethanol to give N-(2,4-dichlorophenyl)-2-(5-tetrazolyl)aniline as long, colorless needles, M.P. 252.5–253.5° (dec.).

*Anal.*—Calcd. for C₁₃H₉Cl₂N₅: C, 51.00; H, 2.96; Cl, 23.16; N, 22.88. Found: C, 51.30; H, 3.14; Cl, 23.36; N, 22.89.

Example 14

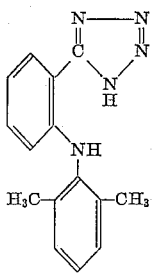

*2-(2,6-dimethylanilino)benzamide.*—A mixture of N-(2,6-dimethylphenyl)anthranilic acid (20.0 g., 0.083 mole) and thionyl chloride (10.37 g., 0.087 mole) in methylene chloride (120 ml.) was heated under reflux for 2 hrs. The cooled reaction mixture was poured onto a mixture of ammonium hydroxide (350 ml., sp. gr. 0.90) and ice (200 g.). The resulting mixture was stirred at room temperature for 15 min., then reduced in volume in a rotating evaporator until no methylene chloride remained. The residual aqueous suspension was filtered. The collected solid was recrystallized from methanol to give a product A (10.3 g.) M.P. 156–173°. From the mother liquors was obtained an additional quantity (2.39 g.) of material B, M.P. 167–173°. Crops A and B were combined and recrystallized from "Skellysolve B"-benzene to give 2-(2,6-dimethylanilino)benzamide (11.0 g.) as colorless crystals, M.P. 155–157°.

*2 - cyano-N-(2,6-dimethylphenyl)aniline.*—2 - (2,6 - dimethylanilino)benzamide (11.0 g.) was dehydrated to give 2-cyano-N-(2,6-dimethylphenyl)aniline (7.49 g.), M.P. 100–107° by a method similar to that described above for the preparation of N-(3-chlorophenyl)-2-cyanoaniline. The product was recrystallized successively from "Skellysolve B," methanol, and finally, "Skellysolve B" to give pale yellow crystals, M.P. 109–112°.

*Anal.*—Calcd. for C₁₅H₁₄N₂: C, 81.05; H, 6.35; N, 12.60. Found: C, 80.93; H, 6.65; N, 12.73.

*N-(2,6-dimethylphenyl) - 2 - (5 - tetrazolyl)aniline.*—A mixture of 2-cyano-N-(2,6-dimethylphenyl)aniline (5.49 g., 0.0247 mole), sodium azide (1.95 g., 0.03 mole) and ammonium chloride (1.605 g., 0.03 mole) in dimethylformamide (85 ml.) was heated, with stirring at about 123° for 18 hrs. The reaction mixture was reduced to dryness. Water (250 ml.) was added to the residue and the resulting aqueous suspension was acidified with concentrated hydrochloric acid. The precipitated solid was collected and recrystallized from aqueous methanol to yield yellow crystals (3.82 g.) M.P. 182.5–187.5°. The product was recrystallized from aqueous ethanol followed by aqueous methanol (with treatment with decolorizing carbon) to give N-(2,6-dimethylphenyl)-2-(5-tetrazoyl-yl)aniline as pale yellow plates, M.P. 192–193°.

*Anal.*—Calcd. for C₁₅H₁₅N₅: C, 67.90; H, 5.70; N, 26.40. Found: C, 68.15; H, 6.00; N, 26.36.

Example 15

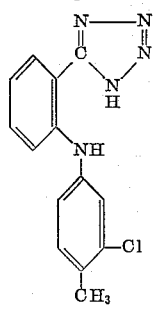

*2-(3-chloro-4-methylanilino)benzamide.*—A suspension of N-(3-chloro-4-methylphenyl)anthranilic acid (13.7 g.) in methylene chloride (90 ml.) containing thionyl chloride (6.8 g.) was heated under reflux for 2 hrs. The reaction mixture was cooled and slowly added to a cooled (5–10°) ammonium hydroxide solution (175 ml., sp. gr. 0.90) with good stirring. The resulting mixture was then stirred at room temperature for 1 hr. Methylene chloride (1 l.) was added to the reaction mixture and the mixture well shaken. The methylene chloride layer was separated, dried over anhydrous sodium sulfate, and reduced to dryness. The residual solid was recrystallized from aqueous ethanol to give a yellow crystalline solid (7.05 g.), M.P. 129–131°. A portion of the product was recrystallized from cyclohexane-benzene, followed by aqueous ethanol, to give 2-(3-chloro-4-methylanilino) benzamide as yellow plates, M.P. 132–133°.

*Anal.*—Calcd. for C₁₄H₁₃ClN₂O: C, 64.51; H, 5.03; Cl, 13.60; N, 10.75. Found: C, 64.47; H, 4.94; Cl, 13.73; N, 10.85.

*N-(3 - chloro-4-methylphenyl)-2-cyanoaniline.*—2 - (3-chloro-4-methylanilino)benzamide (5.5 g.) was dehydrated to yield N-(3-chloro-4-methylphenyl)-2-cyanoaniline (4.0 g.), M.P. 126.5–127.5°, by a method similar to that described above for the preparation of N-(3-chlorophenyl)-2-cyanoaniline. The product was recrystallized from cyclohexane, after treatment with decolorizing carbon, to give pale yellow crystals, M.P. 128–129°.

*Anal.*—Calcd. for C₁₄H₁₁ClN₂: C, 69.31; H, 4.57; Cl, 14.61; N, 11.54. Found: C, 69.48; H, 4.86; Cl, 15.03; N, 11.69.

*N-(3-chloro-4-methylphenyl)-2-(5-tetrazolyl)aniline.*—A mixture of N-(3-chloro-4-methylphenyl)-2-cyanoaniline (3.5 g., 0.0144 mole), sodium azide (1.4 g., 0.0215 mole) and ammonium chloride (1.1 g., 0.0206 mole) in dimethylformamide (30 ml.) was heated, with stirring, at about 125° for 16 hrs. The reaction mixture was reduced to dryness. Water (250 ml.), followed by enough sodium carbonate to give a basic solution, was added to the residue. The solution was washed with chloroform, treated with decolorizing carbon, filtered, cooled, and acidified with concentrated hydrochloric acid. The precipitated solid was recrystallized from aqueous ethanol to give an off-white product (3.05 g.) M.P. 218–220°. Recrystallization from aqueous ethanol gave N-(3-chloro-4-methylphenyl)-2-(5-tetrazolyl)-aniline as off-white crystals, M.P. 218.5–220°.

*Anal.*—Calcd. for C₁₄H₁₂ClN₅: C, 58.86; H, 4.24; Cl, 12.41; N, 24.52. Found: C, 58.57; H, 4.32; Cl, 12.59; N, 24.78.

Example 16

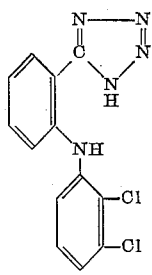

*2-(2,3-dichloroanilino)benzamide.*—A suspension of N-(2,3-dichlorophenyl)anthranilic acid (8.5 g., 0.0301 mole) in methylene chloride (60 ml.) containing thionyl chloride (3.7 g., 0.0311 mole) and dimethylformamide (15 drops) was heated under reflux for 1.5 hrs. The cooled reaction mixture was slowly added, with stirring to a cooled (5–10°) ammonium hydroxide solution (100 ml., sp. gr. 0.90). The resulting mixture was stirred at room temperature for 0.5 hr. The methylene chloride layer was separated, dried over anhydrous sodium sulfate, and reduced to dryness to leave a pale yellow crystalline product (8.4 g.), M.P. 140–142.5°. A portion of the solid was recrystallized twice from benzene to yield 2-(2,3-dichloroanilino)benzamide as off-white crystals, M.P. 167–169°.

*2 - cyano - N - (2,3-dichlorophenyl)aniline.*—2-(2,3-dichloroanilino)benzamide (6.0 g.) was dehydrated by a method similar to that described above for the preparation of N-(3-chlorophenyl)-2-cyanoaniline to give 2-cyano-N-(2,3-dichlorophenyl)aniline (3.4 g.), M.P. 124–125°. The product was recrystallized from cyclohexane to give pale yellow crystals, M.P. 126–127°.

Anal.—Calcd. for $C_{13}H_8Cl_2N_2$: C, 59.34; H, 3.06; Cl, 26.95; N, 10.65. Found: C, 59.41; H, 3.09; Cl, 26.86; N, 10.88.

N - (2,3 - dichlorophenyl) - 2-(5-tetrazolyl)aniline.—A mixture of 2-cyano-N-(2,3-dichlorophenyl)aniline (2.6 g., 0.0099 mole), sodium azide (0.75 g., 0.0115 mole), and ammonium chloride (0.6 g., 0.0112 mole) in dimethylformamide (20 ml.) was heated, with stirring, at about 120° for 17 hrs. The reaction mixture was reduced to dryness in a rotating evaporator. Cold water (50 ml.) and enough sodium carbonate to give a clear solution were added to the residue. The solution was washed with chloroform, treated with decolorizing carbon, filtered, cooled, and acidified with concentrated hydrochloric acid. The precipitated solid was recrystallized from aqueous ethanol to give off-white crystals (2.5 g.), M.P. 201.5–203.5°. The product was recrystallized from aqueous ethanol to give N-(2,3-dichlorophenyl)-2-(5-tetrazolyl)aniline as off-white crystals, M.P. 202–203°.

Anal.—Calcd. for $C_{13}H_9Cl_2N_5$: C, 51.00; H, 2.96; Cl, 23.16; N, 22.88. Found: C, 51.21; H, 3.12; Cl, 23.43; N, 22.87.

In the carrageenin test described above this compound at a dosage of 150 mgm./kg. gave 34% inhibition of edema.

*Example 17*

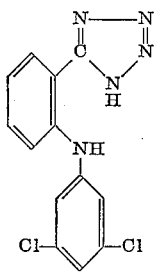

2-(3,5-dichloroanilino)benzamide.—A suspension of N-(3,5-dichlorophenyl)anthranilic acid (23.0 g., 0.0815 mole) in methylene chloride (250 ml.) containing thionyl chloride (10.2 g., 0.0856 mole) and dimethylformamide (12 drops) was heated under reflux for 2 hrs., and was then allowed to stand at 25° for 19 hrs. The reaction mixture was poured onto an ice-cold ammonium hydroxide solution (300 ml., sp. gr. 0.90) with stirring. The reaction mixture was stirred at room temperature for 0.5 hr., and then filtered. The collected solid was combined with a solid obtained by evaporating the methylene chloride layer to dryness. The combined solid was recrystallized from methanol, after treatment with decolorizing carbon, to give pale yellow needles (16.0 g.) M.P. 172–174.5°. The product was recrystallized from methanol to give 2-(3,5-dichloroanilino)benzamide as yellow crystals, M.P. 173–174.5°.

2 - cyano - N-(3,5-dichlorophenyl)aniline.—2-cyano-N-(3,5-dichlorophenyl)aniline (11.6 g.) was prepared from 2-(3,5-dichloroanilino)benzamide (12.6 g.) by a method similar to that described above for the preparation of N-(3-chlorophenyl)-2-cyanoaniline. The product was recrystallized twice from methanol to give colorless needles, M.P. 168–170°.

N - (3,5 - dichlorophenyl) - 2-(5-tetrazolyl)aniline.—A mixture of 2-cyano-N-(3,5-dichlorophenyl)aniline (7.6 g., 0.0289 mole), sodium azide (2.065 g., 0.0318 mole), and ammonium chloride (1.70 g., 0.0318 mole) in dimethylformamide (80 ml.) was heated, with stirring, at about 123° for 17 hrs. The reaction mixture was reduced to dryness. Water (300 ml.) was added to the residue and the aqueous mixture acidified with concentrated hydrochloric acid. The precipitated solid was recrystallized from aqueous ethanol, after treatment with decolorizing carbon, to give colorless crystals (6.5 g.), M.P. 213.5–214.5° (dec.). The product was recrystallized again from aqueous ethanol to give N-(3,5-dichlorophenyl)-2-(5-tetrazolyl)aniline as colorless crystals, M.P. 211.5–213°.

In the carrageenin test described above this compound at a dosage of 150 mgm./kg. gave 49% inhibition of edema.

*Example 18*

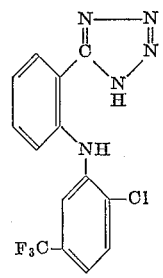

N - (2 - chloro - 5 - trifluoromethylphenyl)anthranilic acid.—A mixture of potassium o-bromobenzoate (46.9 g., 0.196 mole), 2-chloro-5-trifluoromethylaniline (38.4 g., 0.196 mole), and calcium hydride (6.19 g., 0.147 mole) in diethylene glycol dimethyl ether (50 ml.) was heated to about 85° under an atmosphere of nitrogen when cupric bromide (2.0 g.) was added. The temperature of the heating bath was then raised to and maintained at 160° for 2.25 hrs. Water (250 ml.) was cautiously added to the cooled reaction mixture, followed by concentrated hydrochloric acid (300 ml.). The resulting mixture was stirred at room temperature for 1 hr. and then filtered. The collected solid was well washed with cold water and recrystallized, after treatment with decolorizing carbon, from aqueous methanol to yield a light-brown crystalline solid (21.7 g.), M.P. 178–180°. The product was recrystallized twice from "Skellysolve B"-benzene to give N-(2-chloro-5-trifluoromethylphenyl)anthranilic acid as colorless crystals, M.P. 182.5–184°.

Anal.—Calcd. for $C_{14}H_9ClF_3NO_2$: C, 53.26; H, 2.87; N, 4.55. Found: C, 53.55; H, 2.99; N, 4.26.

2-(2 - chloro - 5 - trifluoromethylanilino)benzamide.—A suspension of N-(2-chloro-5-trifluoromethylphenyl)anthranilic acid (24.2 g., 0.076 mole) in methylene chloride (250 ml.) containing thionyl chloride (9.6 g., 0.0806 mole) and dimethylformamide (10 drops) was heated under reflux for 3.25 hrs. The cooled reaction mixture was poured onto an ice-cold ammonium hydroxide solution (400 ml.) with good stirring. The resulting mixture was stirred at 25° for 2 hrs. The methylene chloride layer was separated. The aqueous layer was washed with methylene chloride and the methylene chloride washings combined with the methylene chloride layer. The combined methylene chloride solution was dried over anhydrous sodium sulfate and reduced to dryness to yield a tan crystalline solid (22.0 g.), M.P. 157–165°. The solid was recrystallized twice from aqueous methanol, after treatment with decolorizing carbon, to give 2-(2-chloro-5-trifluoromethylanilino)benzamide as off-white crystals, M.P. 167–169°.

Anal.—Calcd. for $C_{14}H_{10}ClF_3N_2O$: C, 53.43; H, 3.20; N, 8.90. Found: C, 53.51; H, 3.44; N, 8.72.

N - (2 - chloro - 5 - trifluoromethylphenyl) - 2 - cyanoaniline.—Triethylamine (14.66 g., 0.145 mole) was added to an ice-cold solution of 2-(2-chloro-5-trifluoromethylanilino)benzamide (22.8 g., 0.0725 mole) in phosphorus oxychloride (200 ml.) containing dimethylformamide (20.3 ml.). The solution was heated under reflux for 0.5 hr. The reaction was worked up in a similar manner to that described above in the preparation of N-(3-chlorophenyl)-2-cyanoaniline to give N-(2-chloro-5-trifluoromethylphenyl)-2-cyanoaniline (13.7 g.) as light-orange crystals, M.P. 98–103°. The product was recrystallized twice from "Skellysolve B," with treatment with decolorizing carbon, to give pale yellow crystals, M.P. 102.5–104.5°.

N - (2 - chloro - 5 - trifluoromethylphenyl) - 2 - (5-tetrazolyl)aniline.—A mixture of N-(2-chloro-5-trifluoromethylphenyl)-2-cyanoaniline (10.0 g., 0.0337 mole), sodium azide (2.41 g., 0.037 mole), and ammonium chloride (1.98 g., 0.037 mole) in dimethylformamide (100 ml.) was heated at 130° for 20 hrs. The reaction mixture was reduced to dryness. Water (300 ml.), and enough 5% sodium hydroxide to bring about complete solution, were added to the residue. The solution was washed with chloroform and acidified with concentrated hydrochloric acid. The precipitated solid was recrystallized from aqueous ethanol, after treatment with decolorizing carbon, to give N-(2-chloro-5-trifluoromethyl-phenyl)-2-(5-tetrazolyl)aniline (8.8 g.) as pale yellow needles, M.P. 228–229° (dec.).

Anal.—Calcd. for $C_{14}H_9ClF_3N_5$: C, 49.49; H, 2.67; N, 20.62. Found: C, 49.55; H, 2.91; N, 20.79.

In the carrageenin test described above this compound at a dosage of 150 mgm./kg. gave 35% inhibition of edema.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

I claim:

1. The acidic compounds of the formula

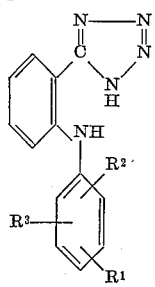

wherein $R^1$, $R^2$ and $R^3$ are each hydrogen, chloro, bromo, iodo, fluoro, trifluoromethyl, trifluoromethoxy, trifluoromethylthio, (lower)alkyl, (lower)alkoxy, nitro, methylsulfonyl, di(lower)alkylamino or (lower)alkylthio; and nontoxic, pharmaceutically acceptable salts thereof.

2. The acidic compounds of claim 1 having the formula

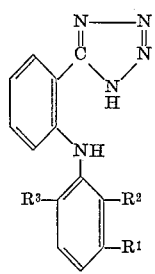

wherein $R^1$ is a member selected from the group consisting of chloro, bromo, iodo, fluoro, trifluoromethyl, trifluoromethoxy, trifluoromethylthio, (lower)alkyl, (lower)alkoxy, nitro, methylsulfonyl, di(lower)alkylamino and (lower)alkylthio and $R^2$ and $R^3$ are each a member selected from the group consisting of hydrogen, chloro, bromo, iodo, fluoro, trifluoromethyl, trifluoromethoxy, trifluoromethylthio, (lower)alkyl, (lower)alkoxy, nitro, methylsulfonyl, di(lower)alkylamino or (lower)alkylthio but $R^2$ is hydrogen only when $R^3$ is also hydrogen; and nontoxic, pharmaceutically acceptable salts thereof.

3. The acidic compounds of claim 1 having the formula

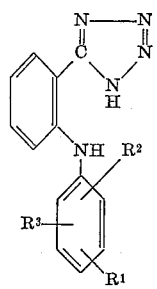

wherein $R^1$, $R^2$ and $R^3$ are each hydrogen, chloro, bromo, trifluoromethyl, methyl or nitro; and nontoxic, pharmaceutically acceptable salts thereof.

4. The acidic compounds of claim 1 having the formula

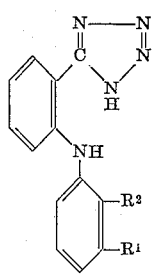

wherein $R^1$ represents (lower)alkyl and $R^2$ represents hydrogen or (lower)alkyl; and nontoxic, pharmaceutically acceptable salts thereof.

5. The acidic compounds of claim 1 having the formula

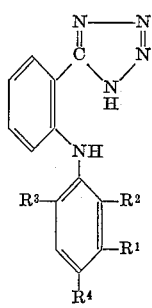

wherein $R^1$ represents hydrogen, trifluoromethyl or methyl and $R^2$, $R^3$ and $R^4$ each represent hydrogen, chloro or methyl; and nontoxic, pharmaceutically acceptable salts thereof.

6. The acidic compounds of claim 1 having the formula

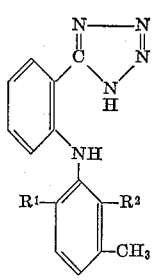

wherein $R^1$ and $R^2$ each represent halogen; and nontoxic, pharmaceutically acceptable salts thereof.

7. The acidic compounds of claim 1 having the formula

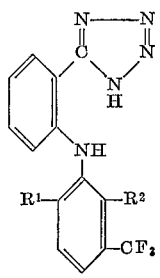

wherein $R^1$ and $R^2$ each represent halogen; and nontoxic, pharmaceutically acceptable salts thereof.

8. The compound of claim 1 which is 2-(5-tetrazolyl)-N-(3-trifluoromethylphenyl)aniline.

9. The compound of claim 1 which is 2-(5-tetrazolyl)-N-(2,3-dimethylphenyl)aniline.

10. The compound of claim 1 which is 2-(5-tetrazolyl)-N-(2,6-dichloro-3-methylphenyl)aniline.

11. The compound of claim 1 which is 2-(5-tetrazolyl)-N-(2,6-dibromo-3-methylphenyl)aniline.

12. The compound of claim 1 which is 2-(5-tetrazolyl)-N-(2,3,6-trimethylphenyl)aniline.

13. The compound of claim 1 which is 2-(5-tetrazolyl)-N-(6-chloro-2,3-trimethylphenyl)aniline.

14. The compound of claim 1 which is 2-(5-tetrazolyl)-N-(2,6-dichloro-2,3-trimethylphenyl)aniline.

15. The compound of claim 1 which is 2-(5-tetrazolyl)-N-(4-chloro-2,3-trimethylphenyl)aniline.

16. The compound of claim 1 which is N-(4-chlorophenyl)-2-(5-tetrazolyl)aniline.

17. The compound of claim 1 which is N-(2,6-dichlorophenyl)-2-(5-tetrazolyl)aniline.

18. The compound of claim 1 which is N-(3-chloro-4-methylphenyl)-2-(5-tetrazolyl)aniline.

19. The compound of claim 1 which is N-(2,3-dichlorophenyl)-2-(5-tetrazolyl)aniline.

20. The compound of claim 1 which is N-(3,5-dichlorophenyl)-2-(5-tetrazolyl)aniline.

21. The compound of claim 1 which is N-(2-chloro-5-trifluoromethylphenyl)-2-(5-tetrazolyl)aniline.

References Cited by the Applicant

UNITED STATES PATENTS

| | | |
|---|---|---|
| 2,977,372 | 3/1961 | Finnegan et al. |
| 3,123,615 | 3/1964 | Rorig. |
| 3,138,636 | 6/1964 | Scherrer. |
| 3,155,666 | 11/1964 | Cusic. |

OTHER REFERENCES

Finnegan et al., J. Amer. Chem. Soc. 80, 3908–3911 (1958).

J. M. McManus et al., J. Org. Chem. 24, 1643–1649 (1959).

R. M. Herbst, Essays in Biochemistry, S. Graff, editor, John Wiley and Sons, Inc., New York, 1956, pp. 141–155.

C. Van de Westeringh et al., Rec. Trav. Chim. 77, 1107–1113 (1958).

B. Brouwer-Van Straaten et al., Rec. Trav. Chim. 77, 1129–1134 (1958).

R. A. Scherrer, C. V. Winder and S. W. Short, Abstracts of the Ninth National Medicinal Chemistry Symposium of the American Chemical Society, Minneapolis, Minn., June 21–24, 1964, pages 11a–11i.

ALEX MAZEL, *Primary Examiner.*

ALTON D. ROLLINS, *Examiner.*